United States Patent
Kurashima

(10) Patent No.: US 9,172,468 B2
(45) Date of Patent: Oct. 27, 2015

(54) OPTICAL TRANSCEIVER WITH OPTICAL RECEIVER ELECTRICALLY ISOLATED FROM HOUSING AND OPTICAL TRANSMITTER WITH ENHANCED HEAT DISSIPATION TO HOUSING

(71) Applicant: Sumitomo Electric Industries, Ltd., Osaka-shi (JP)

(72) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/935,211

(22) Filed: Jul. 3, 2013

(65) Prior Publication Data

US 2014/0010551 A1 Jan. 9, 2014

(30) Foreign Application Priority Data

Jul. 6, 2012 (JP) .................................. 2012-152051

(51) Int. Cl.
*H04B 10/00* (2013.01)
*G02B 6/36* (2006.01)
*H04B 10/40* (2013.01)
*G02B 6/42* (2006.01)

(52) U.S. Cl.
CPC .............. *H04B 10/40* (2013.01); *G02B 6/4246* (2013.01); *G02B 6/4272* (2013.01); *Y10T 29/49002* (2015.01)

(58) Field of Classification Search
USPC ................................ 398/135; 385/83, 88, 92
See application file for complete search history.

(56) References Cited

U.S. PATENT DOCUMENTS

| | | | |
|---|---|---|---|
| 6,633,420 B2 * | 10/2003 | Huang .......................... | 398/135 |
| 6,873,800 B1 * | 3/2005 | Wei et al. ...................... | 398/138 |
| 7,090,509 B1 * | 8/2006 | Gilliland et al. ............. | 439/76.1 |
| 7,542,732 B2 * | 6/2009 | Ka ................ | 455/90.3 |
| 8,104,977 B2 * | 1/2012 | Sone et al. ....................... | 385/92 |
| 2003/0235375 A1 * | 12/2003 | Kamath et al. .................. | 385/92 |
| 2005/0281514 A1 * | 12/2005 | Oki et al. ......................... | 385/92 |
| 2006/0245759 A1 * | 11/2006 | Kurashima .................... | 398/138 |
| 2007/0189673 A1 * | 8/2007 | Yoshikawa ....................... | 385/53 |
| 2009/0211801 A1 * | 8/2009 | Edwards et al. .............. | 174/377 |
| 2010/0018738 A1 * | 1/2010 | Chen et al. ..................... | 174/51 |
| 2010/0039785 A1 * | 2/2010 | Ice .............. | 361/785 |
| 2011/0206328 A1 * | 8/2011 | Wang .............................. | 385/94 |
| 2012/0288240 A1 * | 11/2012 | Kondo et al. .................. | 385/92 |

FOREIGN PATENT DOCUMENTS

| | | |
|---|---|---|
| JP | 2002-353388 A | 12/2002 |
| JP | 2003-222766 A | 8/2003 |
| JP | 2003-243762 A | 8/2003 |

* cited by examiner

*Primary Examiner* — David Payne
*Assistant Examiner* — Pranesh Barua
(74) *Attorney, Agent, or Firm* — Venable LLP; Steven J. Schwarz; Trent B. Ostler

(57) ABSTRACT

An optical transceiver that copes with both the enhanced heat dissipation from heat generating components and the electrical isolation of components processing faint signals from other components generating EMI noises is disclosed. The optical transceiver provides, in addition to a bottom of a frame, a bottom cover made by material with higher thermal conductivity. The former components are directly mounted on the bottom cover through openings in the frame, while, other component to be electrically isolated from the chassis are mounted by putting an insulating support between them and the bottom cover.

14 Claims, 20 Drawing Sheets

ND OPTICAL
OPTICAL TRANSCEIVER WITH OPTICAL RECEIVER ELECTRICALLY ISOLATED FROM HOUSING AND OPTICAL TRANSMITTER WITH ENHANCED HEAT DISSIPATION TO HOUSING

BACKGROUND

1. Field

Embodiments of the present application relate to an optical transceiver, in particular, the application relates to a physical arrangement of a housing of the optical transceiver.

2. Description of Related Art

An optical transceiver generally includes an optical transmitter to transmit an optical signal, an optical receiver to receive another optical signal, a circuit to communicate with the optical transmitter, the optical receiver and the host system, and a housing, typically made of metal, to install the optical transmitter, the optical receiver, and the circuit therein. Thus, an optical transceiver realizes the full-duplex optical communication. As the transmission speed of an optical transceiver continuously increases, components installed within an optical transceiver have generated more heat, which leads to needs for a mechanism for the optical transceiver to dissipate heat further efficiently.

On the other hand, both of the optical transmitter and the optical receiver process electrical signals but signal levels are far different. That is, the optical transmitter switches a large current to drive a light-emitting device, while, the optical receiver receives a faint signal converted from the received optical signal. Accordingly, the optical receiver is necessary to be isolated from EMI noises caused by the optical transmitter. Generally, this isolation is carried out by distinguishing the receiver ground from the transmitter ground. However, when all the housing of the optical receiver, that of the optical transmitter and the transceiver housing are made of metal, the electrical isolation of the optical receiver from the optical transmitter has been left to be a subject to be solved.

SUMMARY

An aspect according to an example of the present application relates to an optical transceiver. The optical transceiver of the example comprises an optical transmitter, an optical receiver, a metal frame, and a bottom cover. The metal frame mounts the optical transmitter and the optical receiver thereof; and openings corresponding to the optical transmitter and the optical receiver. The bottom cover is made of metal and has thermal conductivity greater than that of the metal frame. A feature of the optical transceiver of the example, the optical transmitter is directly in contact with the bottom cover through the opening for the optical transmitter; while, the optical receiver is set in another opening for the optical receiver but electrically isolated from the bottom cover and the metal frame.

BRIEF DESCRIPTION OF THE DRAWINGS

The foregoing and other purposes, aspects and advantages will be better understood from the following detailed description of a preferred embodiment of the invention with reference to the drawings, in which:

FIG. 4A is a perspective view of an assembled support 31; while.

DETAILED DESCRIPTION

Figure 1A:
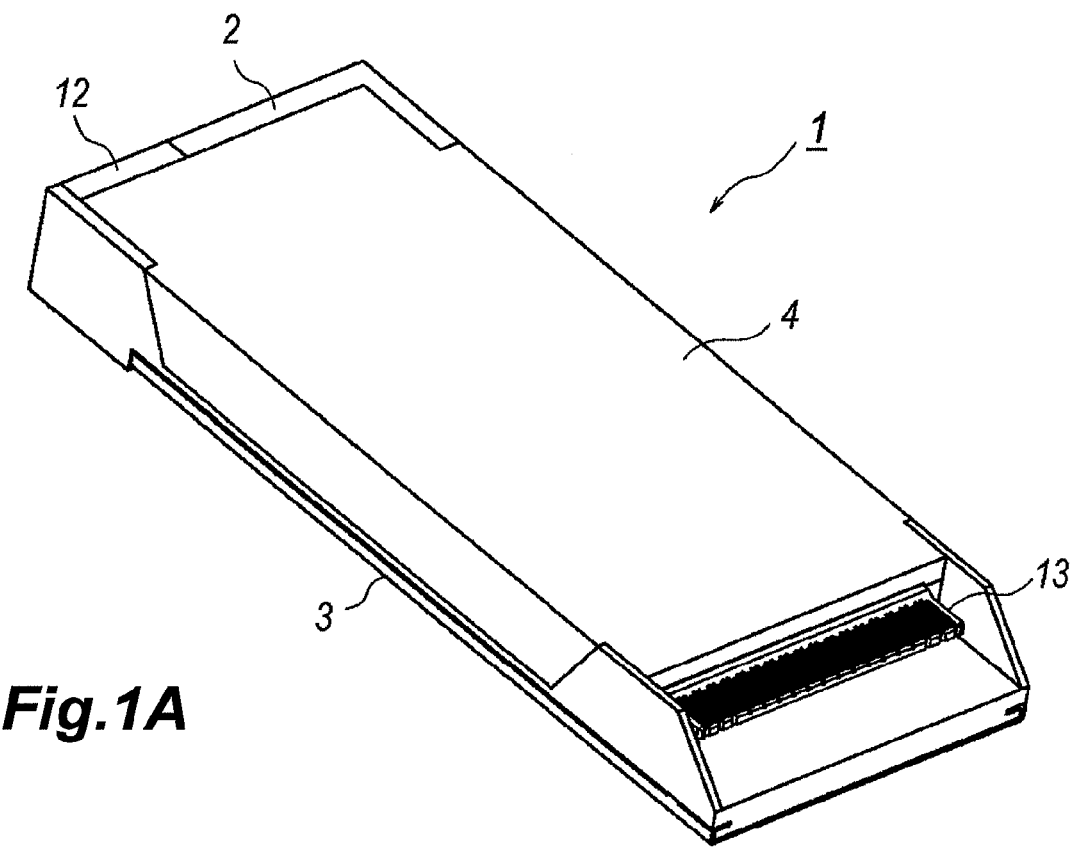
FIGS. 1A and 1B show an outer appearance of an optical transceiver according to an example of the present application.
Figure 1B:
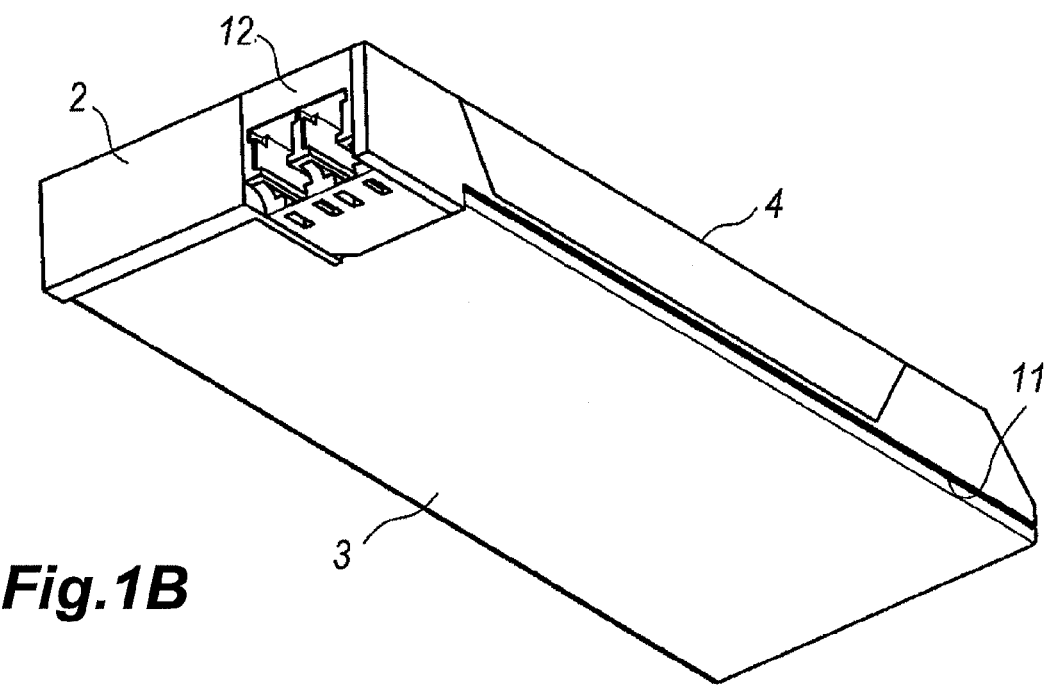

FIGS. 1A and 1B show an outer appearance of an optical transceiver according to an example of the present application, where FIG. 1A views the optical transceiver 1 from a rear top; while, FIG. 1B views it from a front bottom. The optical transceiver 1 provides a frame 2, a bottom cover 3, and a lid 4 as a housing. One end of the frame 2 is provided with an optical receptacle 12 to receive an external optical connector, which is not shown in figures. We call that a side where the optical receptacle 12 is provided is the front, the other side, where an electrical plug 13 is provided, is the rear, the side where the lid 4 is assembled is the top, and the side where the bottom cover 3 is provided is the bottom. Moreover, the longitudinal direction extends from the front to the rear, while, the lateral direction crosses the longitudinal direction. However, these directions of the front, rear, top and bottom are defined only for the explanation sake, and do not restrict the scope of the invention. The frame 2 is preferably made of aluminum alloy, zinc alloy, and so on from viewpoints of the productivity and the cost thereof. The bottom cover 3, which is assembled to a bottom of the frame 2 as shown in FIG. 1B, is preferably made of copper alloy from a viewpoint of the heat dissipating function. The lid 4 is assembled with the frame 2 as exposing the electrical plug 13.

Figure 2A:
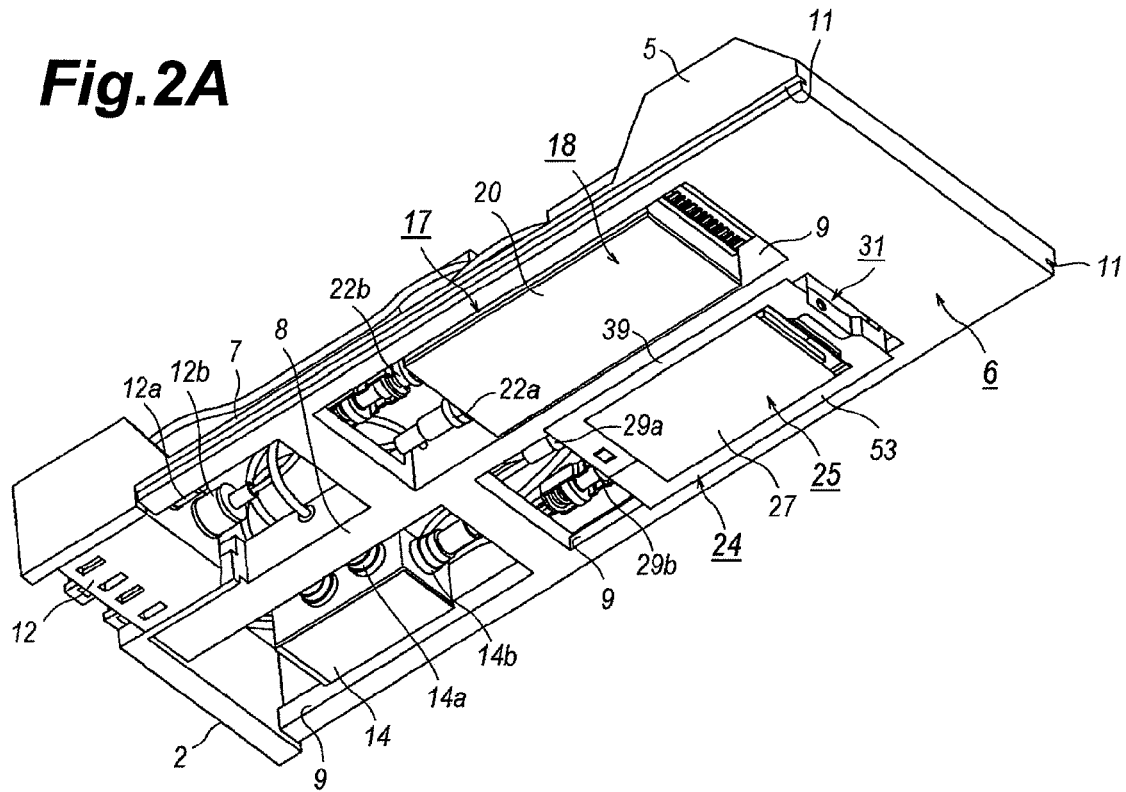
FIGS. 2A and 2B show an inside of the optical transceiver 1.
Figure 2B:
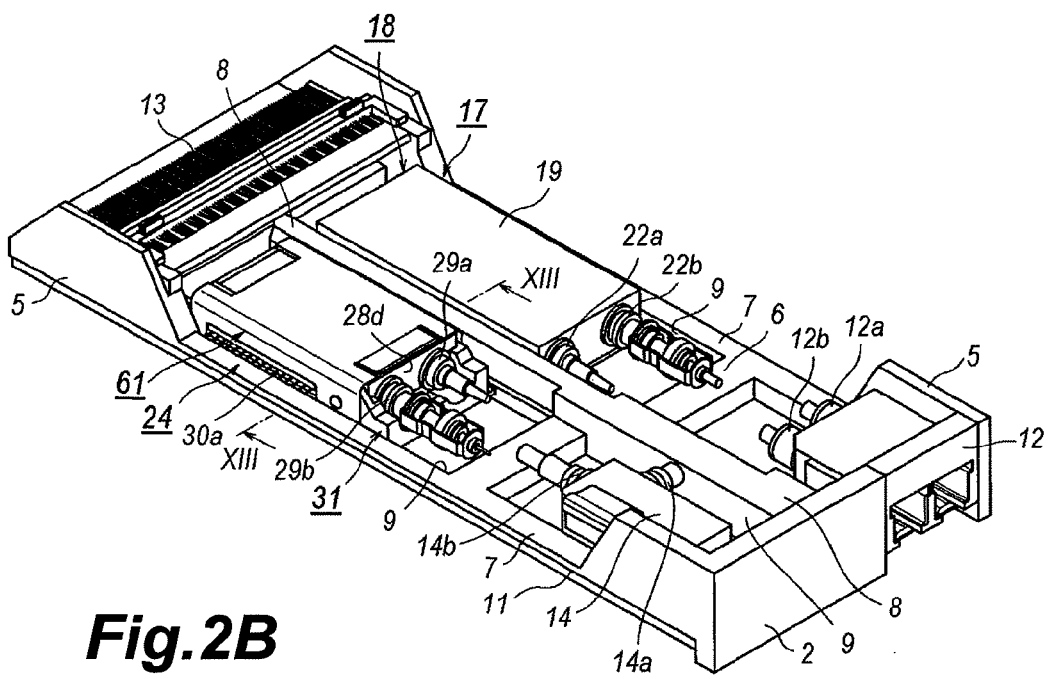

FIGS. 2A and 2B show an inside of the optical transceiver 1, where FIG. 2A views the optical transceiver 1 from the rear bottom; while, FIG. 2B views it from the front top. The frame 2 provides two sides 5 extending longitudinally from the rear end of the optical receptacle 12. A center portion of respective sides 5 is removed to form a cut 7 for receiving sides of the lid 4. The bottom 6 of the frame 2 provides a plurality of openings 9, where the number of the openings 9 in the present example corresponds to a number of optical components installed within the optical transceiver 1. An example of the optical transceiver shown in the figures has three openings 9, one is for an optical transmitter 17, one is for an optical receiver 24, and one is for an optical source 14. The bottom 6 further provides a center beam 8 extending in a longitudinal direction between the openings 9.

The optical transmitter 17 has a housing larger than that of the optical receiver 24. That is, the housing 18 of the optical transmitter 17 is made of metal and has a rectangular shape to enclose semiconductor optical devices as optically active devices and some optical components such as a lens and so on as optically passive devices. FIG. 2B shows a top 19 of the metal housing 18 of the optical transmitter 17, and two optical ports, 22a and 22b, to output modulated optical signal to the optical receptacle 12 and to enter local light coming from the optical source 14.

For the optical receiver 24, it also provides a metal housing 25 with a rectangular shape, namely, the housing 25 provides a top 26, a bottom 27, and four sides, 28a to 28d. The housing 25 installs a photodiode (hereafter denoted as PD) as an optically active device and some optically passive devices, typically lenses. Three sides, 28a to 28c, of the housing 25 provides lead pins, 30a to 30c, while, the last side 28d provides an input port 29a for a received optical signal and another port 29b for a local optical signal.

The optical receptacle 12 provides two optical ports, 12a and 12b, where the former 12a couples with the optical port 22a of the optical transmitter 17, while, the latter 12b couples with the optical port 29a of the optical receiver 24. The optical source 14 provides two ports, 14a and 14b, the former 14a couples with the port 22b of the optical transmitter 17, while the latter 14b couples with the port 29b of the optical receiver 24.

Thus, the optical transmitter 17 receives the local light in the port 22b from the port 14a of the optical source 14, modulates thus received light, and outputs thus modulated optical signal to the port 12a of the optical receptacle 12 from the port 22a. While, the optical receiver 24 receives the local light in the port 29b from the port 14b of the optical source 14 and the signal light in the other port 29a from the port 12b of the optical receptacle 12, multiplexes these two light and detects the phase and the amplitude of the optical signal coming from the optical receptacle 12.

The sides of the bottom 6, or the bottom of two sides 5, provide grooves 11 extending longitudinally. Setting the bottom cover 3 from the rear of the optical transceiver 1 as sliding the edges thereof within the grooves 11, the bottom cover 3 is assembled with the frame 2. The bottom 20 of the housing 18 for the optical transmitter 17 is in physical contact with the bottom cover 3 to enhance the heat dissipating function of the optical transmitter 17. The assembly of the bottom cover 3 with the frame 2, in particular, a mechanism to fit the bottom cover 3 with the frame 2 will be described later.

Figure 3:
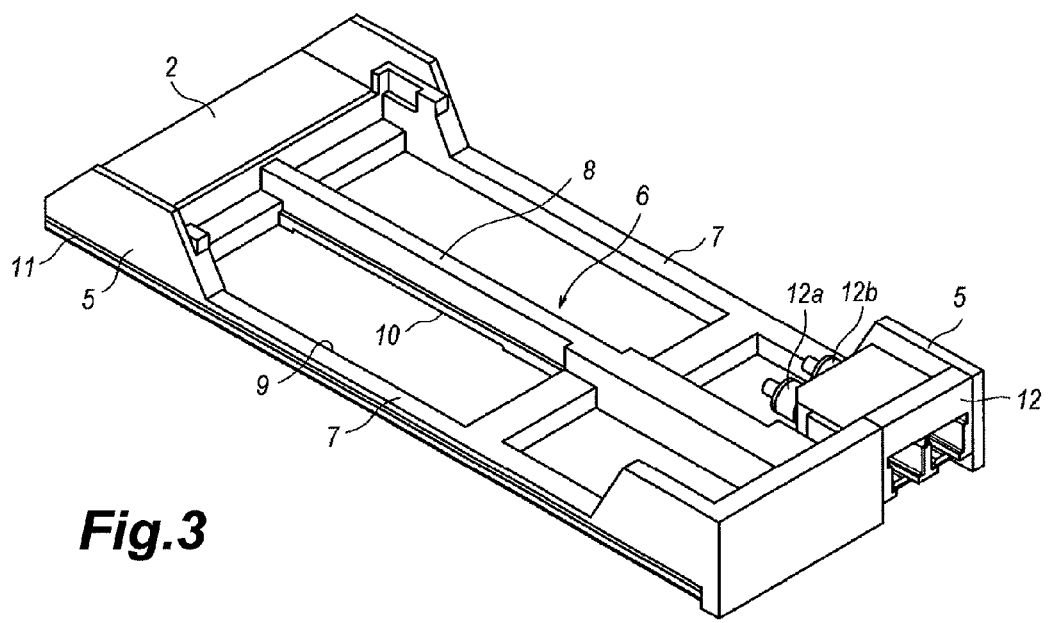
FIG. 3 is an outer appearance of a frame.

FIG. 3 is an outer appearance of the frame 2 without installing any assemblies, 14, 17, and 24. The opening 9 for the optical receiver 24 provides a step 10 in the center beam 8 and the inside of the side 5 (not shown in FIG. 3). As described later, the step 10 receives a flange, 39 and 53, of the support 31 to assemble the optical receiver 24 with the frame 2. The support 31 is made of electrically insulating material, typically an insulating resin, to isolate the metal housing 25 of the optical receiver 24 from the metal frame 2.

Figure 4A:
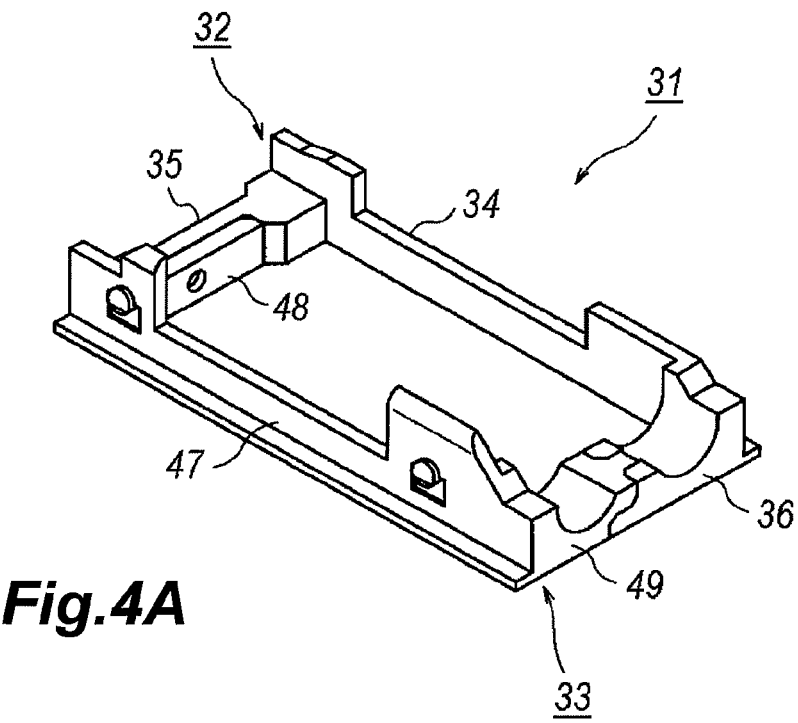
Figure 4B:
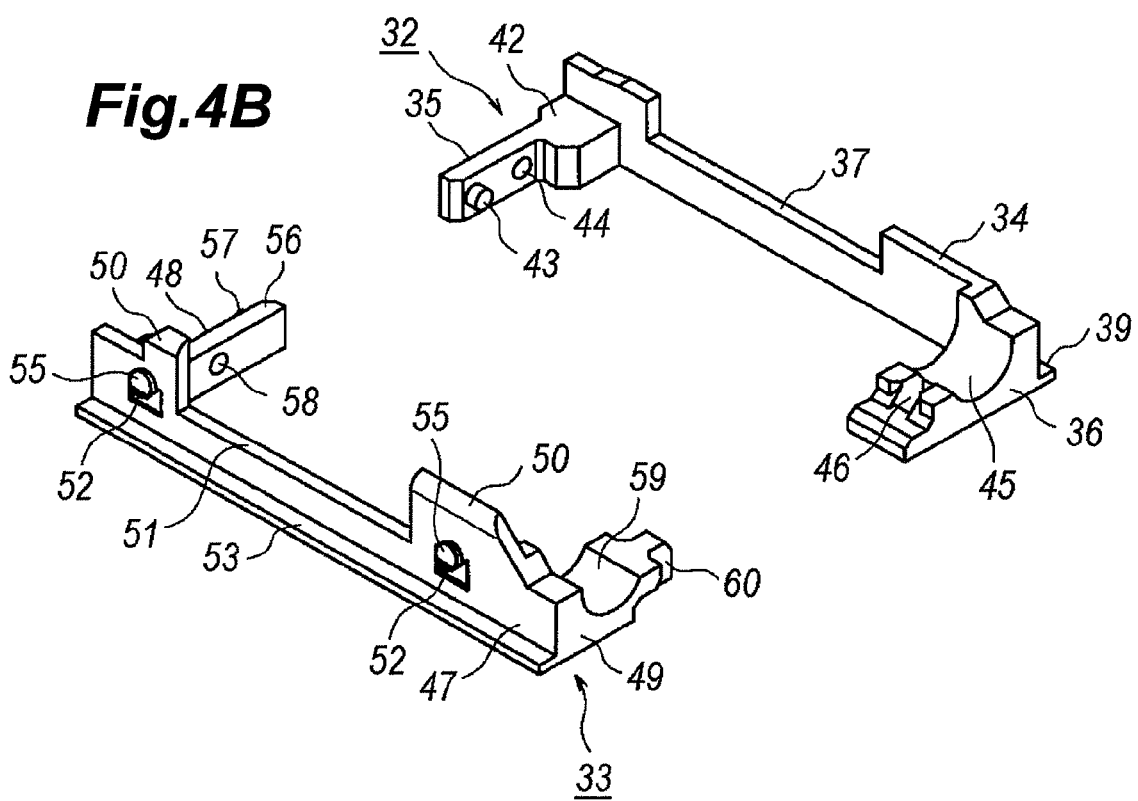
FIG. 4B is an exploded view of the support.
Figure 5:
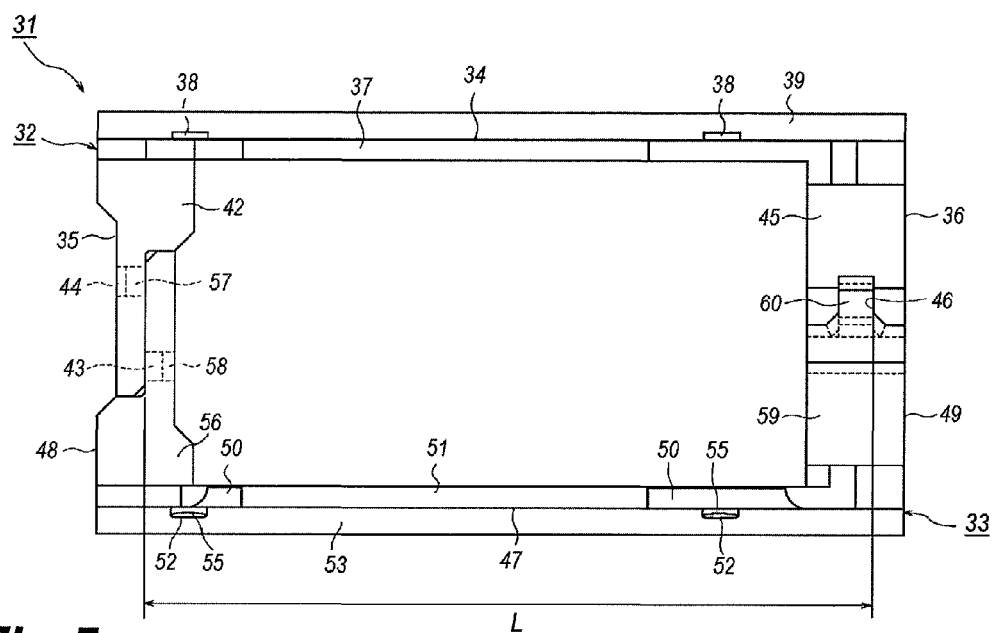
FIG. 5 is a plan view of the support.

FIG. 4A is a perspective view of the assembled support 31, FIG. 4B is an exploded view of the support 31, and FIG. 5 is a plan view of the support 31. The support 31 includes a female part 32 and a male part 33. The female part 32 includes front and rear arms, 35 and 36, and a longitudinal bar 34 connecting the front and rear arms, 35 and 36, where they form a "C" like plane shape. The front and rear arms, 35 and 36, extend from respective end of the longitudinal bar by substantially a right angle. The longitudinal bar 34 provides a cut 37 in a center thereof to expose read pins 30c of the optical receiver 24. The longitudinal bar 34 also provides projections 38, which is shown in FIG. 5 but hidden in FIGS. 4A and 4B, in the outer side of the front and the rear of the longitudinal bar 34. The outer side of the longitudinal bar 34 also provides in the bottom thereof the flange 39 extending outwardly to be received in the step 10 of the opening 9.

The rear arm 35 has a flat surface 42 to support the bottom 27 of the housing 25. That is, the rear arm 32 has a height substantially equal to a height of the portion of the longitudinal bar 34 left by the cut 37. The rear arm 35 further provides a projection 43 and a hole 44 in this order from the tip thereof. The projection 43 protrudes inwardly, while, the hole 44 passes through the whole rear arm 35. The front arm 36 provides a saddle 45 to support the port 29a of the optical receiver 24 and a groove 46 in the tip thereof. The groove 46 has a hollow in the bottom thereof.

The male part 33 also provides a front arm 49, a rear arm 48, and a longitudinal bar 47 connecting two arms, 48 and 49. Two arms, 48 and 49, extend substantially perpendicular to the longitudinal bar 47 towards the female part 32. The longitudinal bar 47 provides a cut 51 in a center thereof through which the lead pins 30a are exposed. The top of the longitudinal bar 47 is chamfered in the outer corner thereof. The longitudinal bar 47, instead of the chamfered corner, may have a rounded top.

Similar to the projections in the longitudinal bar 34 of the female part 32, the longitudinal bar 47 of the male part 33 also provides circular projections 52 in front and rear of the outer surface, whose top corner is also chamfered. Moreover, the longitudinal bar 47 also provides in a bottom thereof a flange 53 similar to the flange 39 in the female part 32 extending outwardly.

The rear arm 48 provides a top flat surface 56 also to support the bottom 27 of the housing 25, and a combination of a projection 57 and an opening 58. The projection 57 protrudes outwardly, while, the opening passes through the whole rear arm 48. On the other hand, the front arm 49 provides a saddle 59 to support the port 29b and a projection 60 in a tip thereof. The projection 60 mates with the groove 46 formed in the front arm 36 of the male part 32.

Referring to FIG. 5, assuming a length L from the front arm to the rear arm, a distance from the rear arm 48 to the front arm 49 of the male part 33 is longer than a distance from the rear arm 35 to the front arm 36 of the female part 32. Accordingly, assembling the male part 33 with the female part 32, the rear and front arms, 48 and 49, of the male part 33 push the rear and front arms, 35 and 36, of the female part 32 outwardly; concurrently, the rear and front arms, 35 and 36, of the female part 32 push the rear and front arms, 48 and 49, of the male part 33 inwardly, which rigidly assembles the male part 32 with the female part 33.

Figure 6:
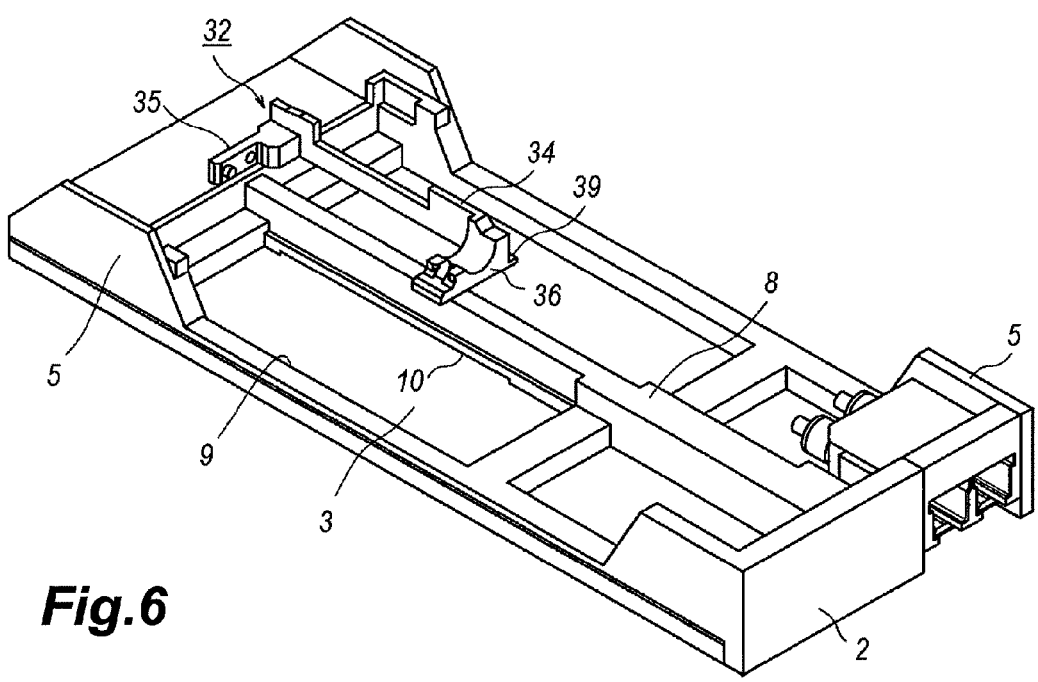
FIG. 6 shows a process to assemble the support with the frame.
Figure 7A:
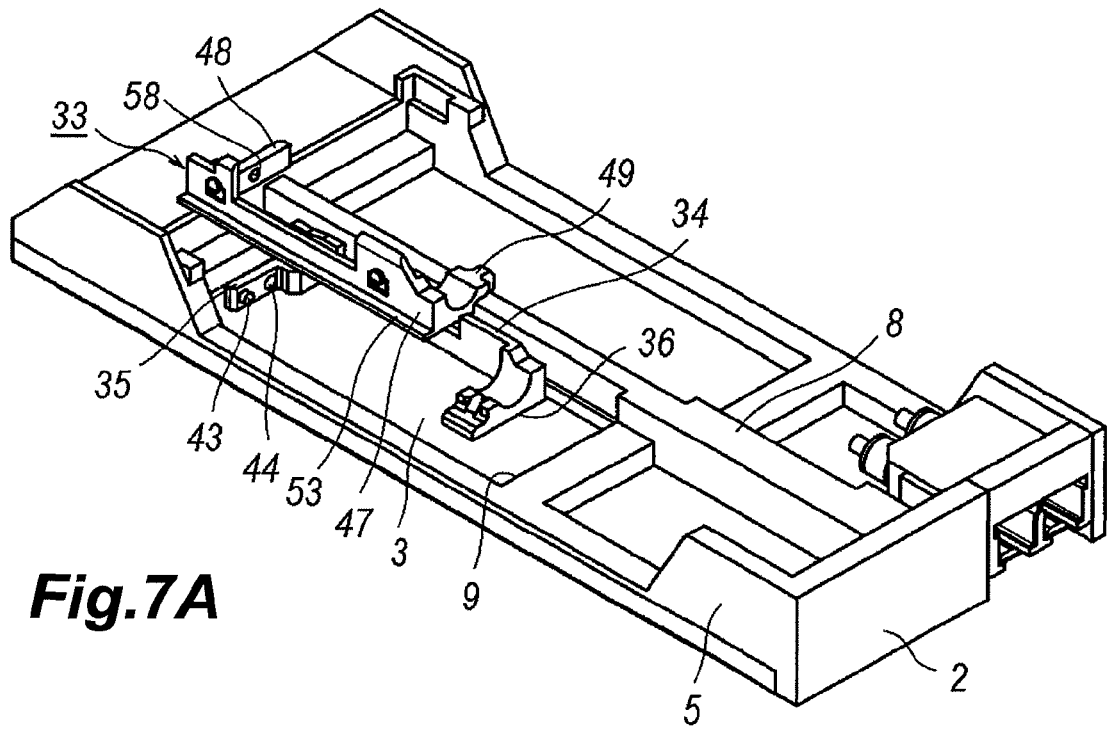
FIGS. 7A and 7B show processes to assemble the support with the frame subsequent to the process shown in FIG. 6.
Figure 7B:
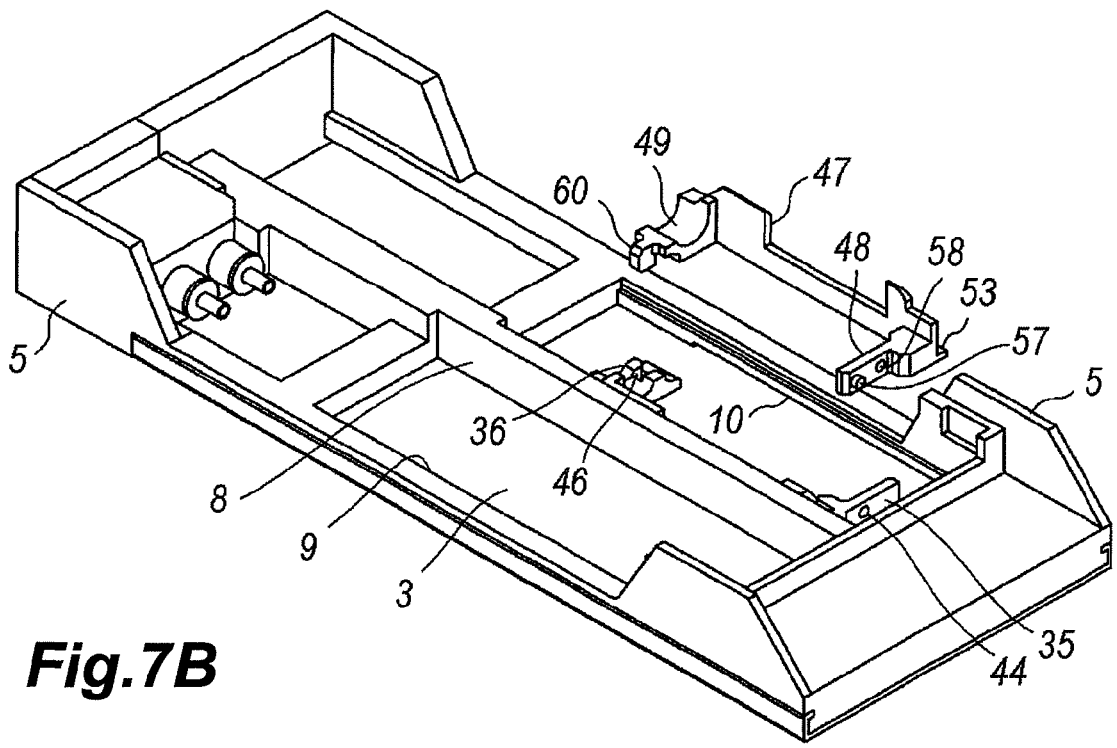
Figure 8:
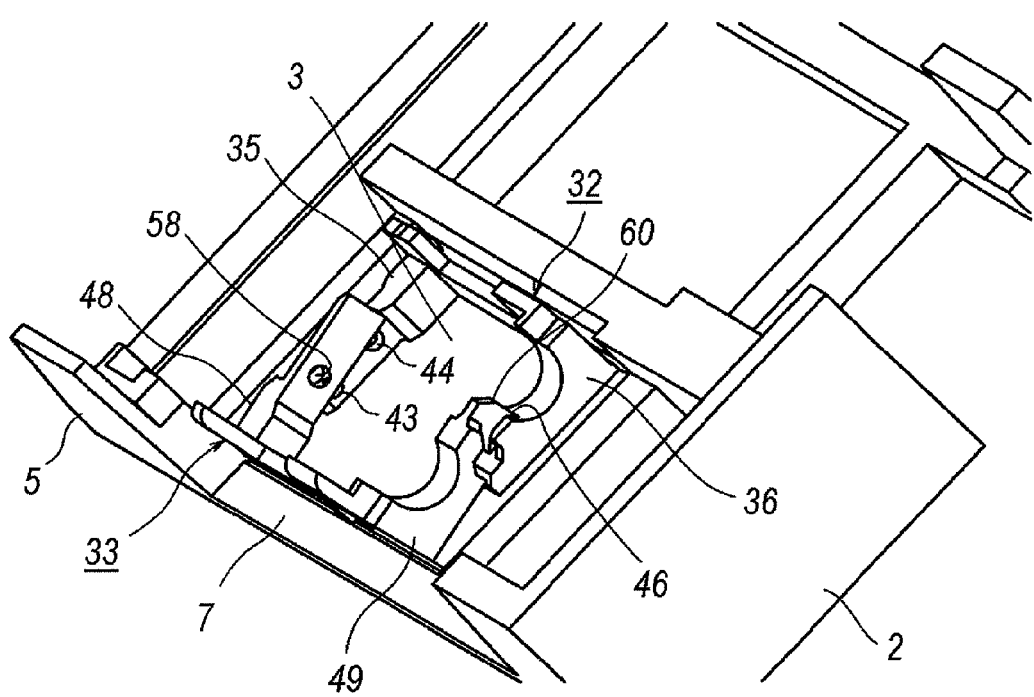
FIG. 8 magnifies a process to assemble the support with the frame subsequent to the process shown in FIG. 7B.

Referring to FIGS. 6 to 8, a process to assemble the support 31 with the frame 2 is shown. First, the female part 32 in the longitudinal bar 34 is arranged along the longitudinal direction of the opening 9, and the flange 39 in the bottom of the longitudinal bar 34 is inserted into a gap formed between the bottom cover 3 and the step 10 of the bottom 6 of the frame 2, which is formed along an edge of the opening 9. Second, as shown in FIG. 7A, the male part 33 in the longitudinal part 47 thereof is arranged also along the longitudinal direction of the opening 9, the flange 53 is inserted into the gap formed between the bottom cover 3 and the step 10 of the frame 2 so as to contact the upper surface of the flange 53 with edge of the step 10 defining the gap.

Then, the male part 33 is inclined so as to direct the rear and front arms, 48 and 49, upwardly. Pushing the rear and front arms, 48 and 49, downwardly, the opening 58 of the male part 33 receives the projection 43 of the rear arm 35 of the female part 32, then, the projection 57 of the male part 33 is inserted into the opening 44 of the female part 32. Moreover, the projection 60 of the male part 33 is set within the groove 46 in the female part 32. Thus, rear arms, 48 and 35, and the front arms, 49 and 36, are rigidly assembled to each other.

Figure 9A:
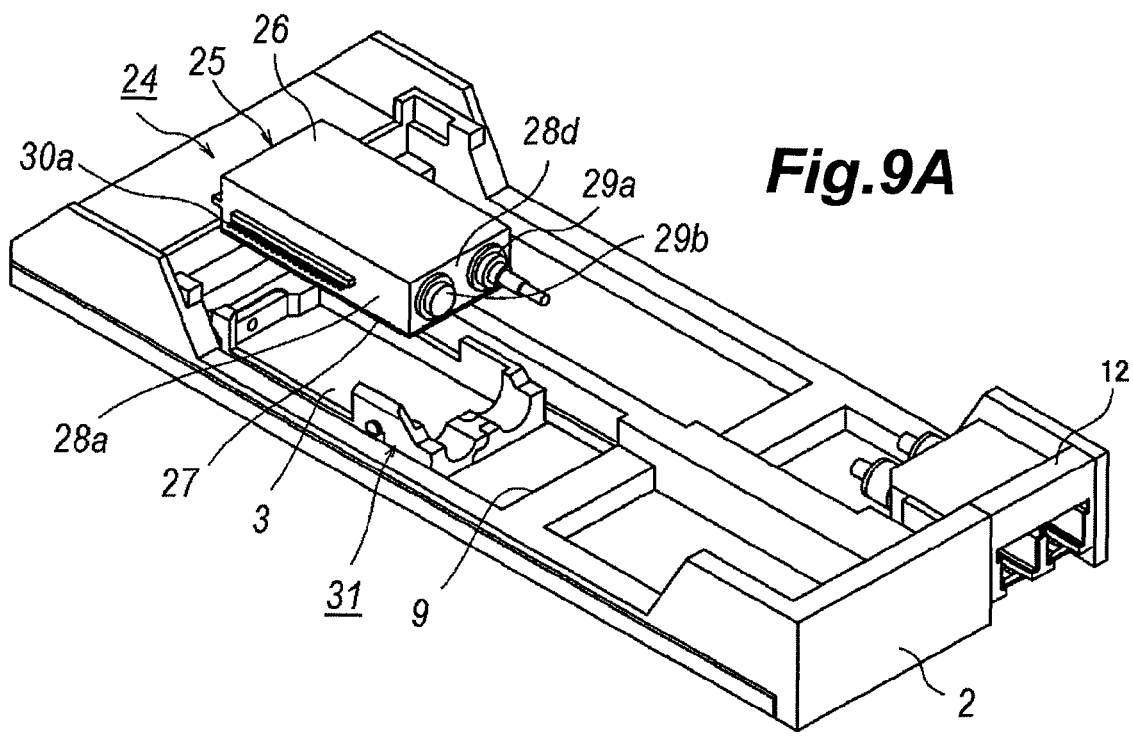
FIGS. 9A and 9B show a process to set an optical receiver on the support.
Figure 9B:
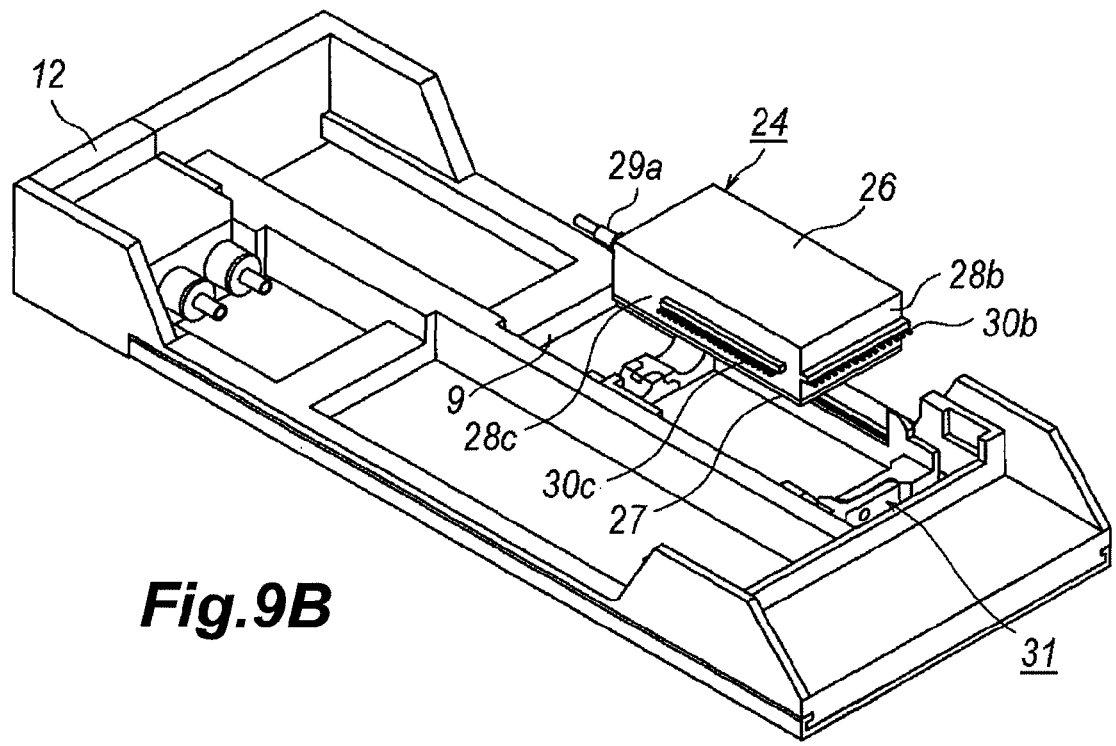
Figure 10A:
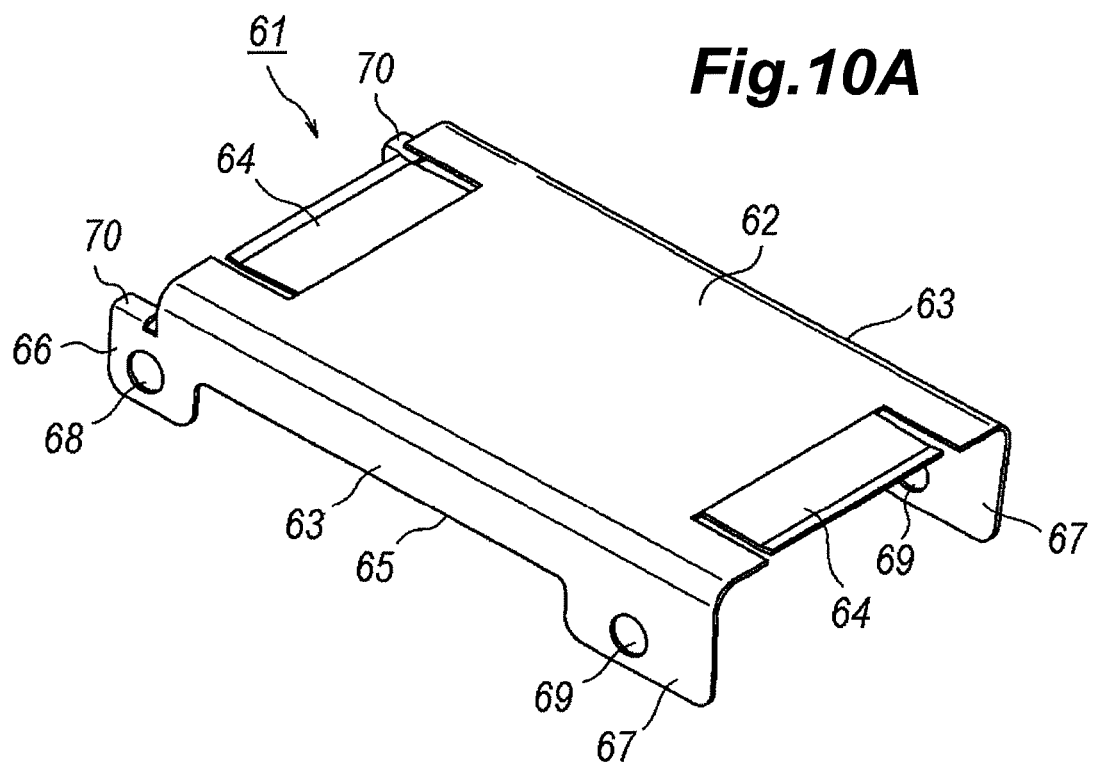
FIG. 10A is a perspective view of a metal cover.
Figure 10B:
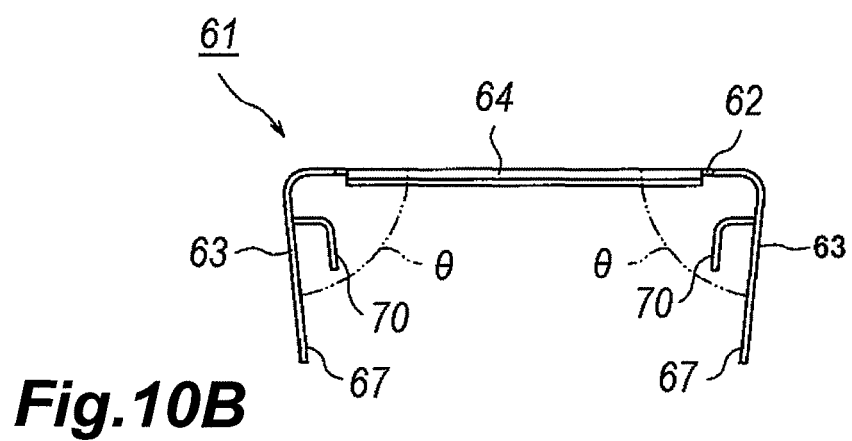
FIG. 10B is a cross section of the metal cover.

Next, as shown in FIGS. 9A and 9B, the optical receiver 24 is set on the support 31 as facing the ports, 29a and 29b, to the optical receptacle 12. Finally, a metal cover 61 fixes the housing 25 in a preset position on the support 31. The metal cover 61, as shown in FIG. 10, is formed by a metal plate only by cutting and bending. The metal cover 61, which has a reversed U-shaped cross section to open downwardly, includes a top 62 and two sides 63 bent downwardly at the side of the top 62. The top 62 provides tabs 64 in the front and rear thereof. The tabs 64 is formed by two longitudinal slits and slightly bent downwardly. The tabs 64 push the top 26 of the housing 25 downwardly against the support 31.

The two sides 63, which are bent downwardly at respective sides of the top 62, provide a cut 65 through which the lead pins, 30a and 30c, of the optical receiver 24 are exposed. The sides 63 also provide, in the rear and the front thereof, skirts, 66 and 67, with circular openings, 68 and 69, in a center thereof. The circular openings, 68 and 69, mate with the projections, 38 and 52, of the support 31 shown in FIG. 4B and FIG. 5. That is, the projections, 38 and 52, are hooked with the circular openings, 68 and 69, of the cover 61. Moreover, the rear skirt 66 provides a hook 70 hooked with the rear end of the longitudinal bars, 34 and 54, of the female and male parts, 31 and 32. Hooking the hook 70 with the rear end of the longitudinal bars, 34 and 54, the metal cover 61 refines the shape thereof. The rear and the front skirts, 66 and 67, as described above, are bent downwardly at the sides of the top 62, but an angle of the rear and the front skirts, 66 and 67, with respect to the top 62 is slightly smaller than a right angle, which further refines the shape of the cover 61.

Figure 11A:
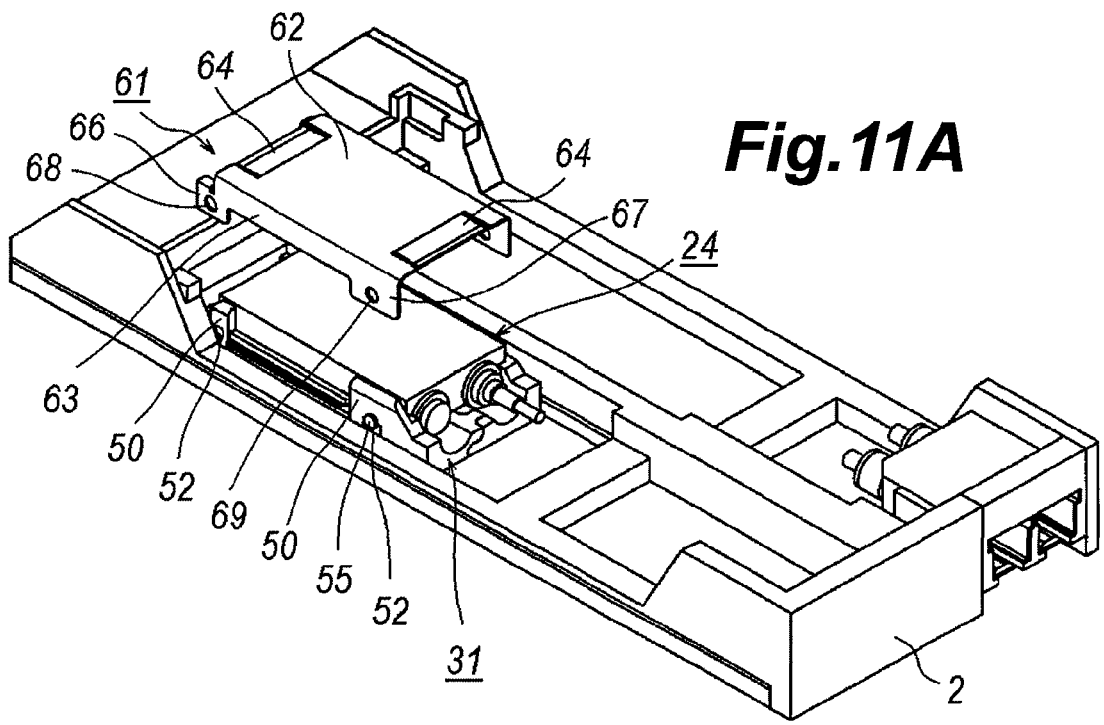
FIGS. 11A and 11B show a process to assemble the metal cover with the support as putting the optical receiver between them.
Figure 11B:
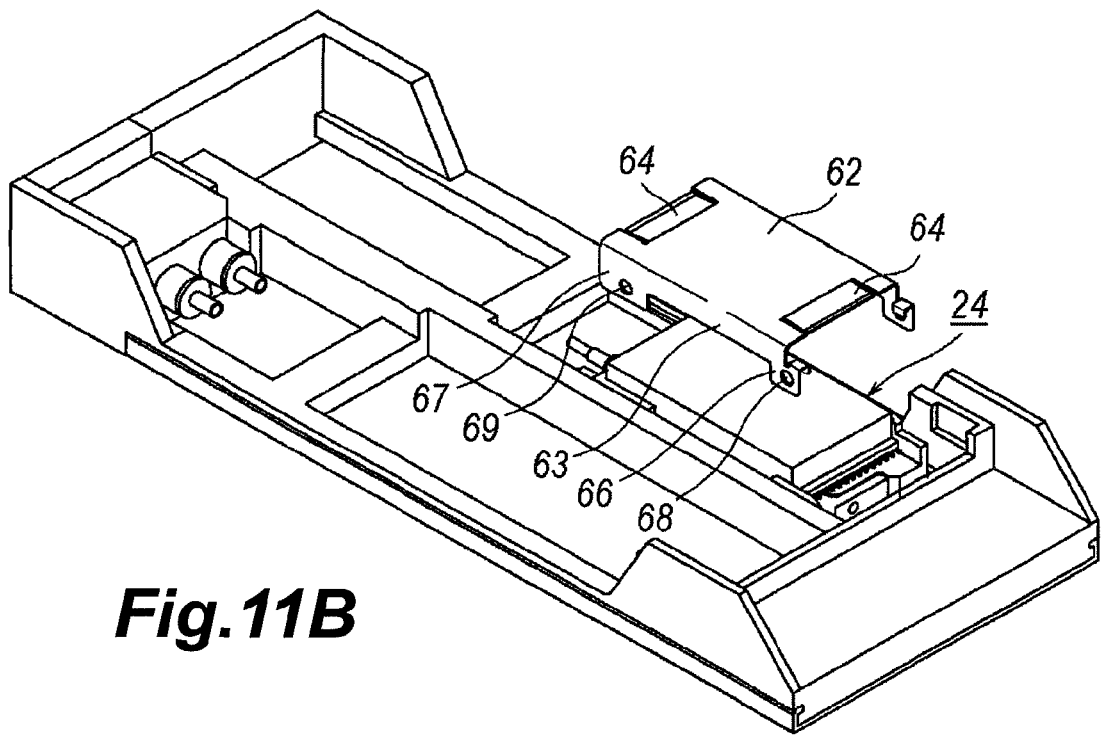

FIGS. 11A and 11B show a process to assemble the cover 61 with the support 31 as putting the optical receiver 24 between them. First, hooking the projections, 38 and 52, in both sides of one of the front and rear of the longitudinal bar, 34 and 54, with the corresponding openings, 68 or 69, among the openings, 69 and 68, of the front skirt 67 and the rear skirt 58 of the cover 61, respectively, as expanding a span between the corresponding skirts 67 or 68 in the two front or two rear skirts, 67 and 68; the cover 61 is able to pivot by the hooked projections 38 and 52 as the axis of the rotation. Then, pivoting the cover 61 to hook the rest projections 38 and 52 in the front or rear of the longitudinal bars, 34 and 54, of the support 31, the cover 61 is assembled with the support 31 as aligning the optical receiver 24 in the preset position on the support 31. Because the rear and front tabs 64 of the top 62 of the cover 61 press the top 26 of the optical receiver 24 downwardly, which inversely lifts the cover 61 upwardly, the hooking of the projections 38 and 52 with the openings, 68 and 69, is secured. Moreover, the rear and front skirts, 66 and 67, of the cover 61 press the support 31 inwardly to enhance the support of the housing 25 of the optical receiver 24. Thus, the optical receiver 24 is securely set on the support 31. Moreover, the support 31 in respective flanges, 39 and 53, is reliably inserted within the gap formed between the step 10 of the frame 2 and the bottom cover 3; accordingly, the optical receiver 24 is securely set within the optical transceiver 1 through the support 31 and the cover 61.

Figure 12:
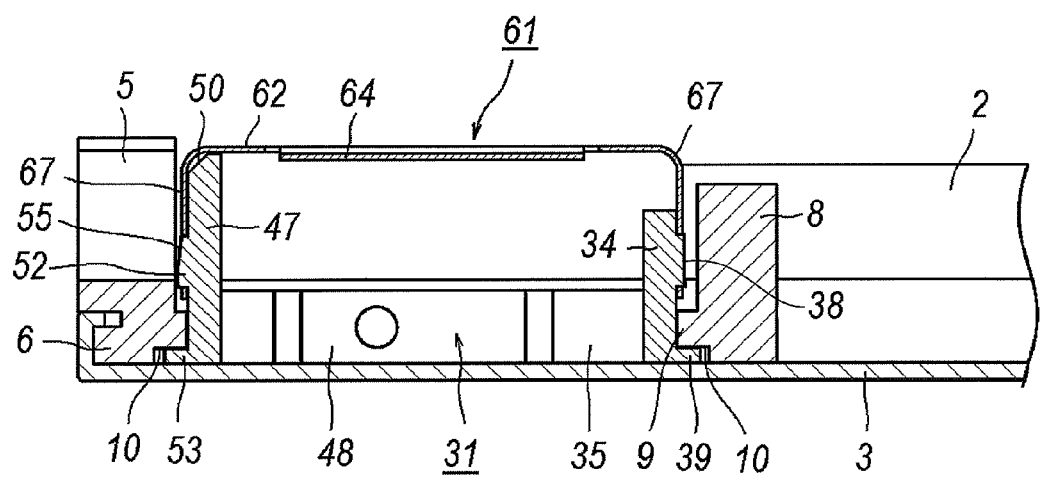
FIG. 12 is a cross section showing the assembly of the metal cover with the support.

FIG. 12 is a cross section of the optical transceiver 1 taken along a line intersecting the front skirts 67, in which FIG. 12 omits the optical receiver 24 set on the support 31. As shown in FIG. 12, the front skirts 67, where the openings 69 are provided in the center thereof, hook the projections 38 and 52 of the support 31, and put the front portion of respective longitudinal bars, 34 and 47, therebetween.

Accordingly, the support 31 is securely held by the cover 61. Moreover, because the tabs 64 of the cover 61 push the top 26 of the housing 25 downwardly, which also pushes the support 31 downwardly because the optical receiver 24 is set on the support 31, and the projections, 38 and 52, are further tightly fastened with the openings 68 and 69.

Figure 13A:
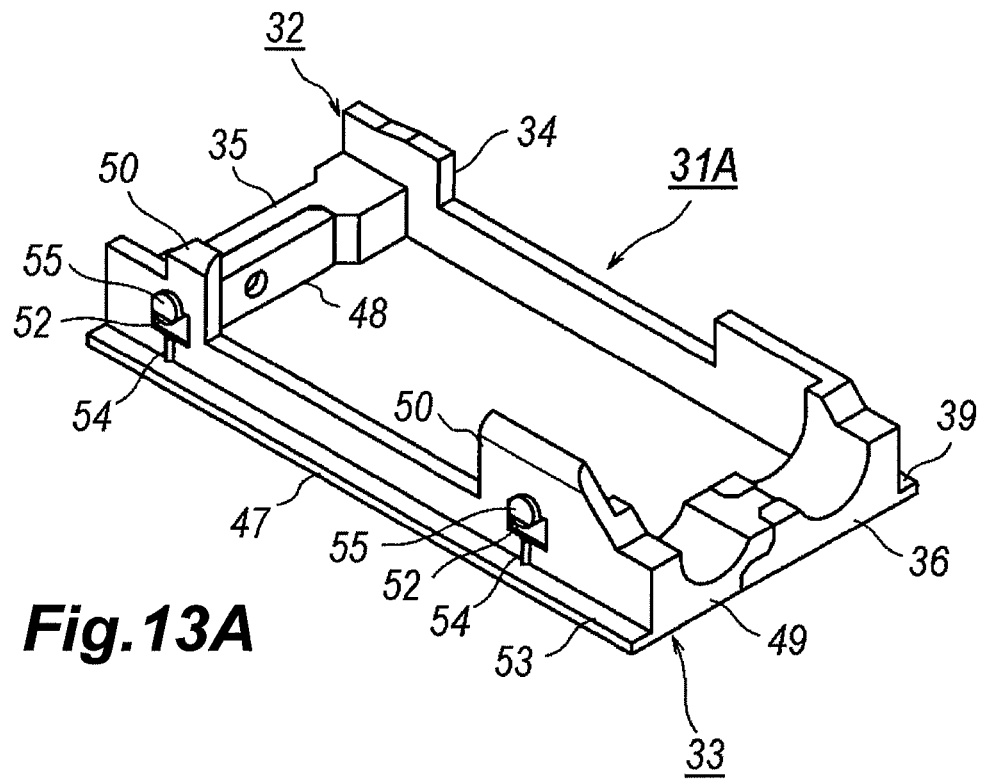
FIG. 13A is a perspective view of another support.
Figure 13B:
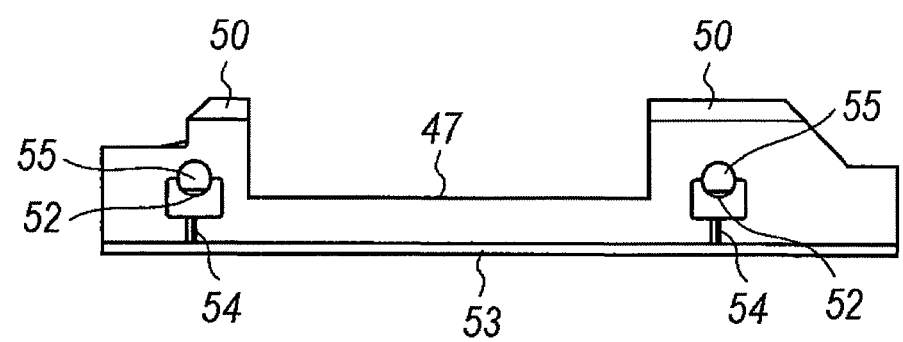
FIG. 13B is a side view of the another support.

FIG. 13A is a perspective view showing a modified support 31A and FIG. 13B is a side view of a support 31A. The modified support 31A provides, in addition to arrangements shown in FIG. 5, ribs 54 beneath the projections 38 and 52 in outer surface of respective longitudinal bars, 34 and 47. The ribs 54, which may have a triangular cross section, are crushable when the modified support 31A is set within the frame 2.

Figure 14:
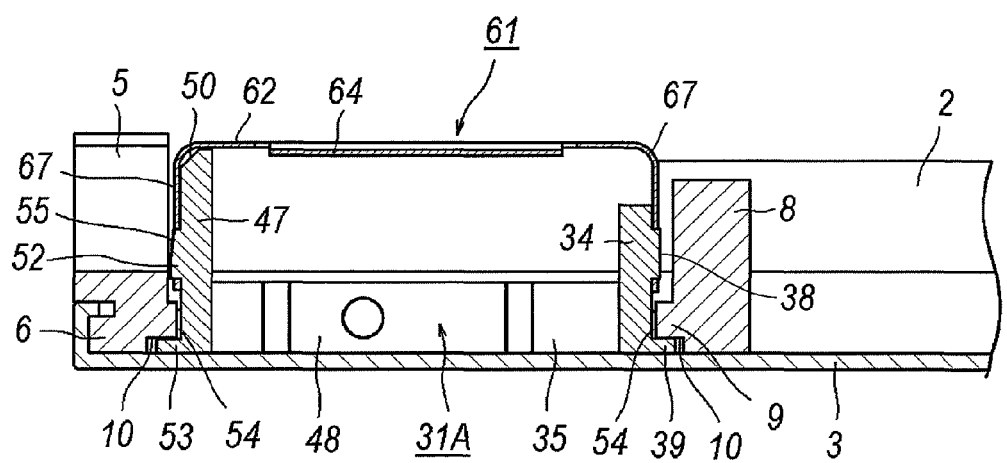
FIG. 14 is a cross section shown an assembly of the metal cover with the another support shown in FIG. 13A.

FIG. 14 is a cross section taken along the lateral direction at a portion where the front skirt 67 of the cover 61 is engaged with the projections 38 and 52 of the modified support 31A. An assembly of the modified support 31A with the frame 2 is carried out by procedures substantially same with the process already described. That is, the female part 32 in the flange 39 thereof is first set within the gap formed between the bottom 6 of the frame 2 and the step 10 of the bottom cover 3; then, the male part 33 in the flange 53 thereof is also set within the gap formed between the step 10 of the bottom 6 of the frame 2 and the bottom cover 3 as fitting the projections, 43 and 57, with the corresponding openings, 58 and 44, in respective arms, 35 and 48, and the projection 60 with the groove 46. Synchronizing with the fitting between the female part 32 and the male part 33, the ribs 54 in the outer surface thereof are crushed by the bottom 6 of the frame 2. Thus, the support 31A may be further tightly set within the opening 9 of the frame 2.

Although the modified support 31A provides ribs 54 in the outer surfaces of respective longitudinal bars, 34 and 57, the modified support 31A may further provide other crushable ribs in the top surface of the flanges, 39 and 53, or the top surfaces, 42 and 56. These ribs on the flanges, 39 and 53, may be crushed when the flanges, 39 and 53, are set within the gap formed between the step 10 of the bottom 6 of the frame 2 and the bottom cover 3 by abutting against the step 10.

Figure 15:
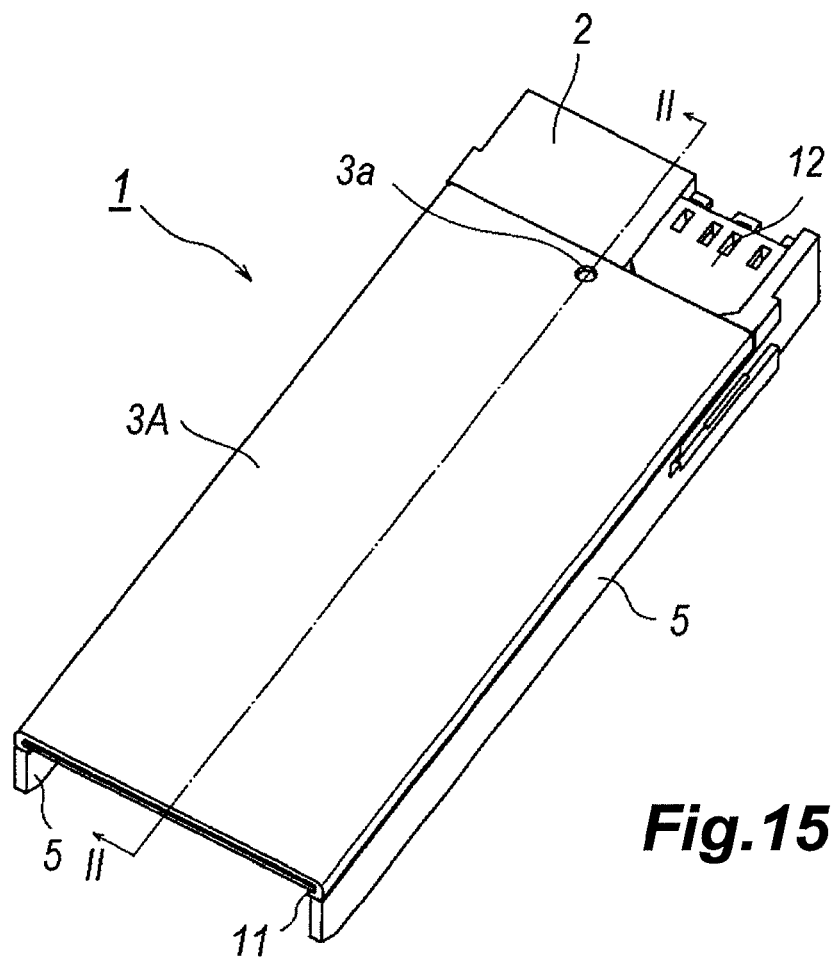
FIG. 15 is a perspective view showing a bottom cover of another example of the present application.

Next, a mechanism to fit the bottom cover 3 with the frame 2 will be described in detail. FIG. 15 is a perspective view of the optical transceiver 1 viewed from the bottom thereof. Although the bottom cover 3 shown in FIG. 2B covers a front end of the frame 2, namely, a portion neighbor to the optical receptacle 12, the bottom cover 3A of the present example ends just front of the optical receptacle 12. As already described, the bottom cover 3A covers the whole bottom of the frame 2 to hide the openings 9 and may be made of, for instance, copper (Cu) or copper alloy; while, the frame 2 may be made of, for instance, aluminum (Al), aluminum alloy, zinc (Zn), zinc alloy, and so on. Generally, the bottom cover 3A may be made of material having thermal conductivity higher than that of material for the frame 2. The example shown in FIG. 15, the frame 2 is formed by die-casting of aluminum or zinc, while, the bottom cover 3A is formed by a copper plate whose thermal conductivity is preferably higher than 280 W/m/K.

When the frame 2 is made of zinc alloy and formed by die-casting and is to be plated with nickel (Ni), the bottom cover 3A, which is made of copper alloy, may be also plated with nickel after the bottom cover 3A is assembled with the frame 2 by the combined process of the strike or flash plating, the electro-plating and nickel plating. In an alternative, the frame 2 and the bottom cover 3A may be individually plated and assembled together after the plating.

The frame 2, as already described in FIGS. 1A to 2B, provides two sides 5 extending longitudinally in both sides of the bottom 6. Moreover, each of the sides 5 provides the groove 11. The bottom cover 3A is slid from the rear of the frame 2 as respective cliffs hooks 3b in respective side edges are guided within the groove 11. Sliding the bottom cover 3A to cover the bottom 6 of the frame 2, the optical transmitter 17 and the local optical source 14 are in contact with the bottom cover 3A through respective openings 9. However, the optical receiver 24 mounted on the support 31 is still electrically isolated from the bottom cover 3A.

The center beam 8 between the openings 9 is formed thicker to secure the stiffness of the frame 2. The sides 5 of the example shown in FIG. 2B provide large cuts 7 removing the whole sides 5 to expose the bottom 6 in the center portion thereof. That is, each of the sides 5 is divided into a front portion and a rear portion. The bottom 6 is exposed between these two portions of each of the sides 5. Accordingly, when no center beam 8 is formed in thicker, the stiffness of the frame 2 along the longitudinal direction becomes insufficient.

Moreover, the optical transmitter 17 and the local optical source 14 are directly in contact with the bottom cover 3 made of copper alloy through the openings 9, and these modules, 14 and 17, therefore enhance the heat dissipating efficiency.

Figure 16:
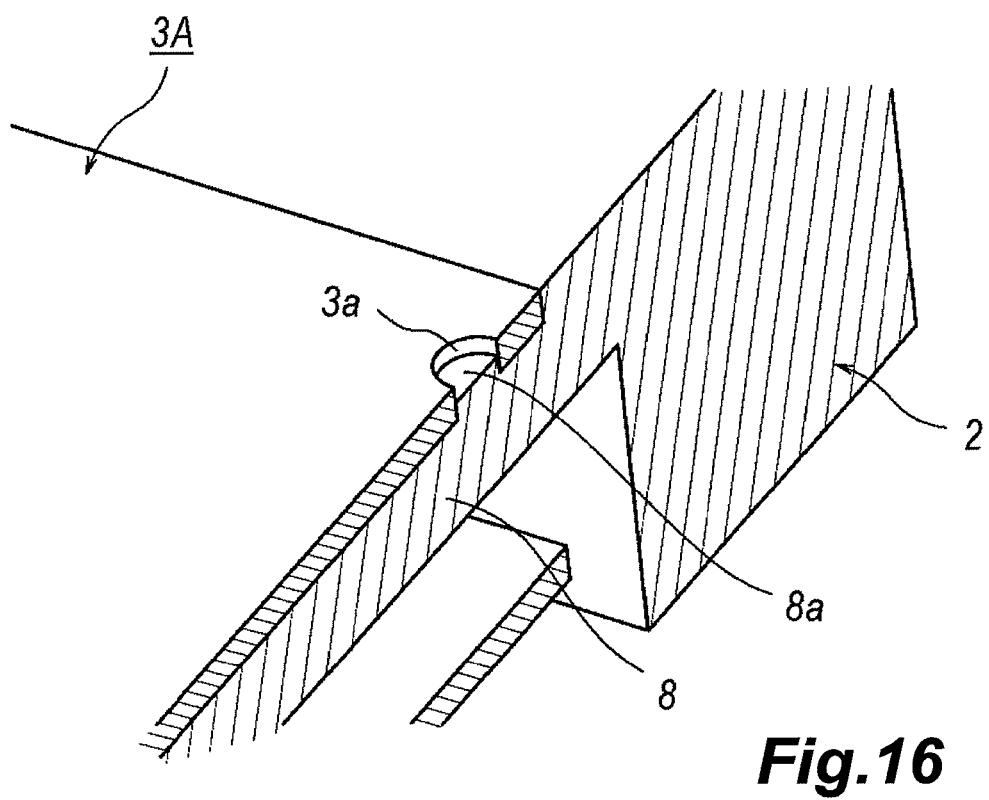
FIG. 16 magnifies a front portion of the another bottom cover and the frame.
Figure 17:
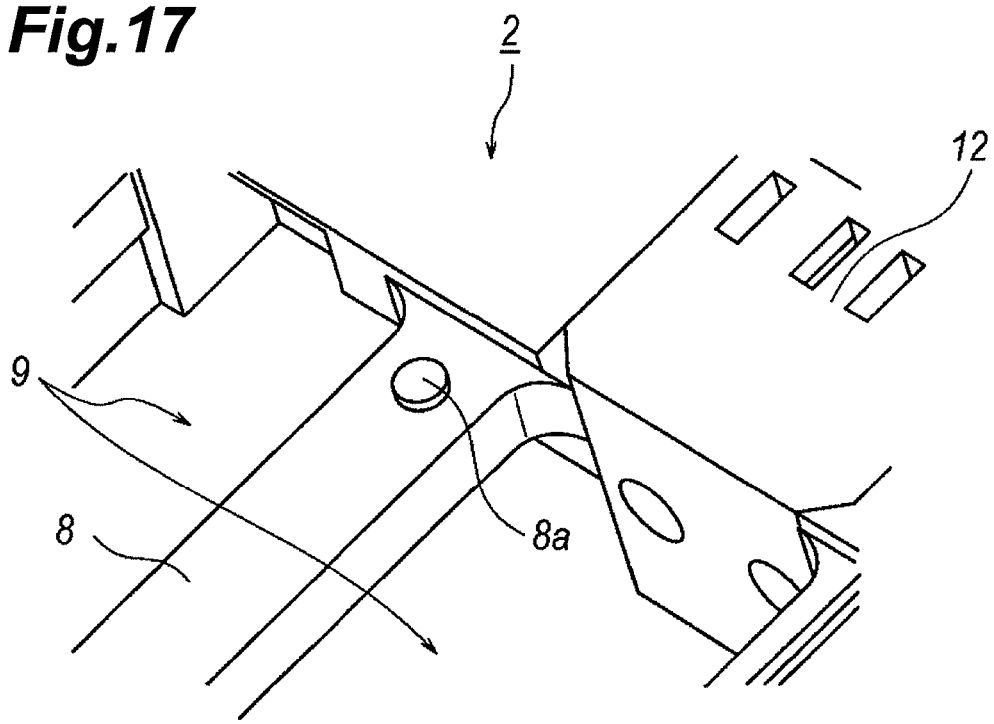
FIG. 17 magnifies a front portion of the frame to be engaged with the bottom cover.

FIG. 16 magnifies a front portion of the bottom cover 3A; while, FIG. 17 also magnifies a front portion of the center beam 8 as removing the bottom cover 3A. The bottom cover 3A provides an opening 3a in a front center thereof, while, the center beam 8 of the frame 2 provides a projection 8a. Sliding the bottom cover 3A on the bottom 6 of the frame 2, the projection 8a engages with the opening 3a to prevent the bottom cover 3A from slipping off from the frame 2. Although the example provides the opening 3a in the bottom cover 3A and the projection 8a in the center beam 8, a snapping mechanism opposite to the example, that is, the projection in the bottom cover 3 and a hollow receiving the projection in the center beam 8 may be practical. Also, the example of the snapping mechanism shown in figures provides an opening to be latched with the projection; but the snapping mechanism may provide, as an alternative, a hollow to receive the projection. Moreover, the example shown in the figures provides the optical receptacle 12 in a position offset from the center of the frame 2, the position of the optical receptacle 2 is not restricted to this position. An arrangement of a center receptacle may be applicable to the optical transceiver 1.

The opening 3a of the present example may have a diameter larger than an outer diameter of the projection 8a by about 0.1 mm to facilitate the engagement between them. The height of the projection 8a is optional, but preferably less than a thickness of the bottom cover 3A. The present example of the frame 2 provides the projection 8a with a height of 0.1 to 0.2 mm. Moreover, the projection 8a and/or the opening may have chamfered edge.

Figure 18A:
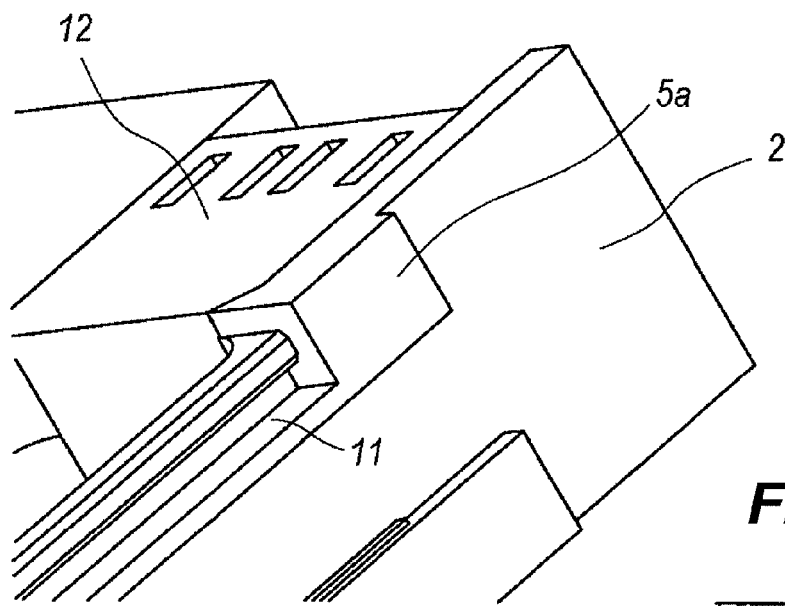
FIG. 18A magnifies a side portion of the frame providing a groove.
Figure 18B:
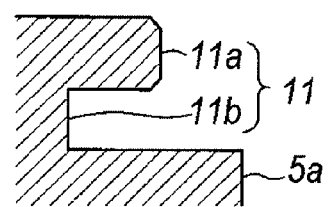
FIG. 18B is a cross section of the groove.

FIG. 18A magnifies a front portion of the frame 2 including the optical receptacle 12, in particular, FIG. 18A shows the groove 11 to set the bottom cover 3A, while, FIG. 18B is a cross section of the groove 11. The groove 11 is formed by a rib 11a and a hollow 11b formed between the rib 11a and the body of the side 5a. The rib 11a has a length from the bottom of the hollow 11b to the top thereof smaller than the length from the bottom of the hollow 11b to a surface of the side 5a by an amount corresponding to a thickness of the bottom cover 3A.

Figure 19A:
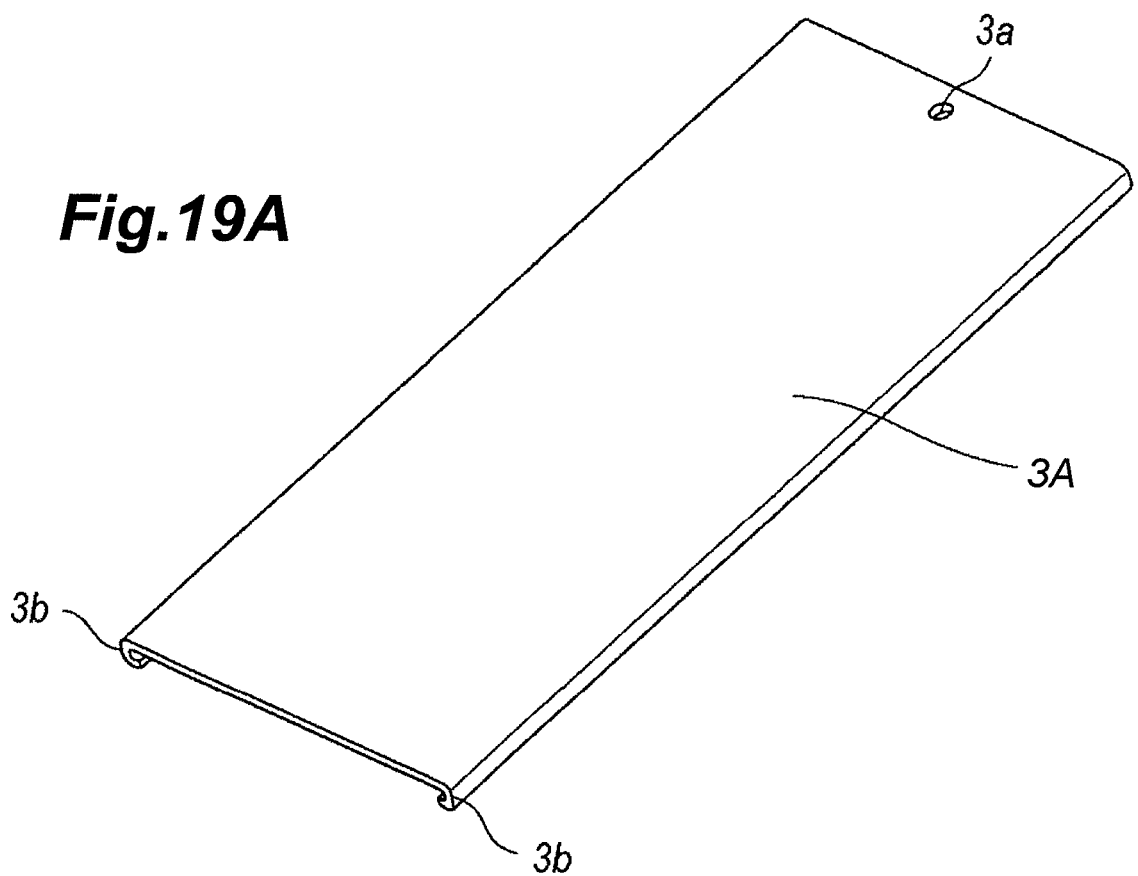
FIG. 19A is a perspective view of the bottom cover with a snapping mechanism and FIG. 19B magnifies an edge of the bottom cover providing a hook to be slid within the groove of the frame.

FIG. 19A is a perspective view of the bottom cover 3A of the present example. As shown in FIG. 19A, the side edges 3b of the bottom cover 3A are bent twice to form the hook 3b, with the U-shaped cross section. The tip 3d of the hook 3b is set within the hollow 11b of the groove 11 when the bottom cover 3A is slid on the bottom 6 of the frame 2 until the projection 8a is engaged with the opening 3a of the bottom cover 3A. Because the hook 3b is formed in respective sides of the bottom cover 3A, the stiffness of the bottom cover 3A is secured along the longitudinal direction.

Figure 19B:
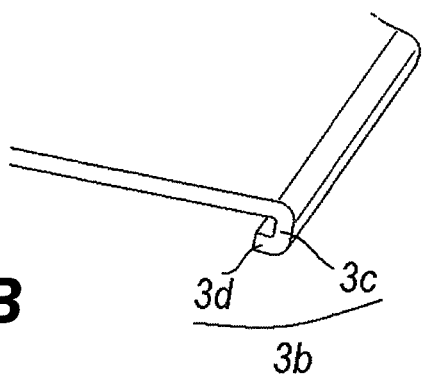

FIG. 19B magnifies the hook 3b in the edge of the bottom cover 3A. As described above, the hook 3b is formed by bending the bottom plate 3A twice but angles by the bending are slightly different. That is, the first bending in the tip side 3d of the bottom cover 3A makes an angle less than a right angle; while, the second bending 3c closer to the center of the bottom cover 3A makes a substantially right angle. Accordingly, when the tip 3d of the hook 3b is set in the hollow 11b of the groove, the U-shaped hook tightly catches the rib 11a of the groove 11.

Figure 20:
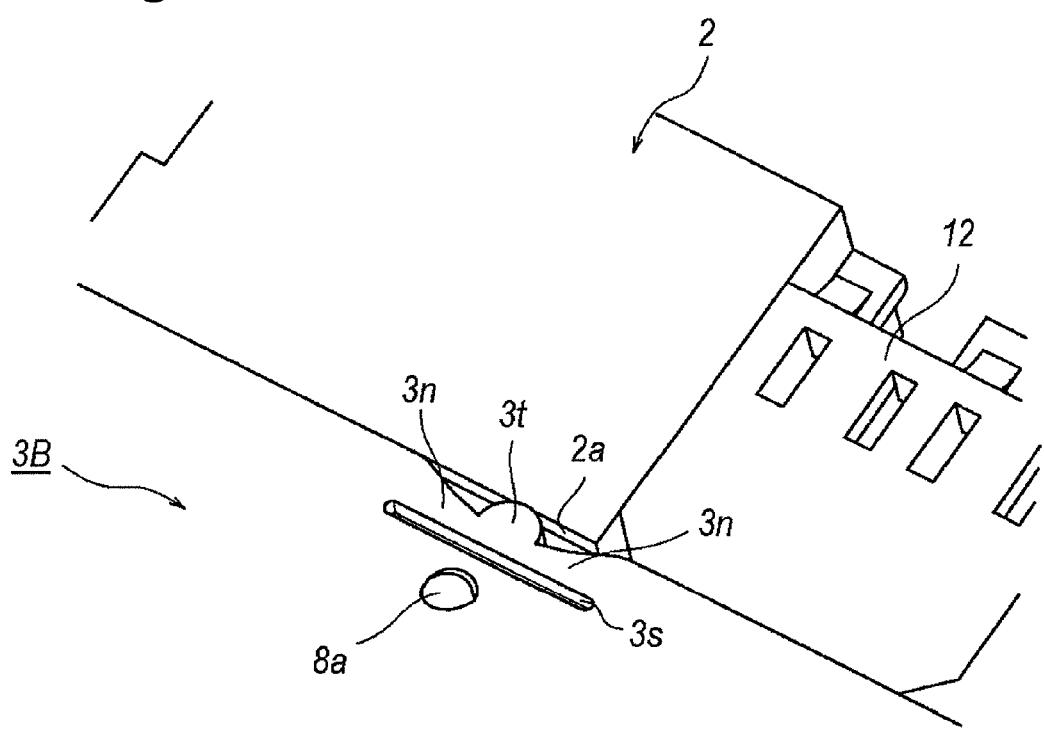
FIG. 20 shows a repulsive mechanism provided in one of the bottom cover and the frame.

FIG. 20 is a perspective view showing another snapping mechanism between a bottom cover 3B and the frame 2. The example shown in FIG. 20 provides in the bottom cover 3B thereof a repulsive mechanism to give a repulsive force against the bottom cover 3B in addition to the opening 3a. That is, the repulsive mechanism includes a protrusion 3t and a lateral slit 3s behind the protrusion 3t. Sliding the bottom cover 3B from the rear of the frame 2 to the front end of the groove 11, the protrusion 3t abuts against the rear wall of the front end of the optical transceiver 1. The lateral slit 3s is formed behind the projection 3t to provide areas 3n with a shortened length between the lateral slit 3s and the edge of the bottom cover 3B. Moreover, the tip of the protrusion 3t protrudes from the front edge of the bottom cover 3B, then, the tip of the protrusion 3t first comes in contact with the rear wall 2a of the front portion of the frame 2. Then, the portions 3n with the shortened length to the edge in both sides of the protrusion 3t elastically push the bottom cover 3B rearward, but the engagement of the projection 8a with the opening 3a compensates this rearward motion of the bottom cover 3B. Thus, the bottom cover 3B may be further tightly set with the frame 2.

Although the example shown in FIG. 20 provides the mechanism to cause repulsive force in the bottom cover 3B, this mechanism may be realized in the frame 2 in the front portion thereof. Thus, according to examples described above, the bottom cover, 3, 3A and 3B, may be securely assembled with the frame 2. Because the bottom cover 3 is made of copper (Cu) with relatively larger thermal conductivity, the bottom cover 3 securely assembled with the frame 2 enhance the heat dissipating function of the components installed within the optical transceiver 1, typically, an optical transmitter 17, and/or a local signal source when the optical transceiver 1 is applied to, what we call, the optically coherent communication system.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical transceiver comprising:
   an optical transmitter;
   an optical receiver;
   a metal frame installing the optical transmitter and the optical receiver thereon, the metal frame having a bottom surface and openings extending through the bottom surface, the openings corresponding to the optical transmitter and the optical receiver; and
   a bottom cover made of metal having thermal conductivity greater than thermal conductivity of the metal frame, the bottom cover overlaying the bottom surface of the metal frame; and
   wherein the optical transmitter is directly in contact with the bottom cover by passing through the opening for the optical transmitter, and the optical receiver is set in the opening for the optical receiver but electrically isolated from the bottom cover and the metal frame.

2. The optical transceiver of claim 1, further comprising a support put between the optical receiver and the metal frame, the support being made of electrically insulating material.

3. The optical transceiver of claim 2,
   wherein the support includes a male part and a female part mated with the male part, each of the male part and the female part including a front arm and a rear arm, the front arm of the male part being assembled with the front arm of the female part and the rear arm of the male part being assembled with the rear arm of the female part.

4. The optical transceiver of claim 2, further comprising a metal cover assembled with the support, the optical receiver being put between the metal cover and the support.

5. The optical transceiver of claim 4,
   wherein the metal cover includes a top and a side bent from the top, the side including a front skirt and a rear skirt, each of the front skirt and the rear skirt having an opening engaged with a projection provided in a side of the support, the top including a tab to push the optical receiver toward the support to secure the engagement of the projection of the support with the opening of the metal cover.

6. The optical transceiver of claim 4,
   wherein the metal cover includes a top and a pair of sides, each of the sides having a front skirt and a rear skirt, and the front skirt and the rear skirt being bent from the top by an angle less than a right angle.

7. The optical transceiver of claim 2,
   wherein the opening for the optical receiver accompanies with a step in a periphery thereof, the step facing the bottom cover, and
   wherein the support includes a flange set between the step of the metal frame and the bottom cover.

8. The optical transceiver of claim 1,
   wherein the metal frame includes a center beam between the openings, the center beam having a thickness larger than a thickness of a bottom of the metal frame.

9. The optical transceiver of claim 1,
   wherein the metal frame includes a side having a groove extending along a longitudinal direction of the optical transceiver from a rear end, and
   wherein the bottom cover includes a hook set in the groove of the side of the metal frame.

10. The optical transceiver of claim 9,
    wherein the metal frame includes one of a hollow and a projection and the bottom cover includes another of the hollow and the projection, the projection being snapped within the hollow.

11. The optical transceiver of claim 10,
    wherein one of the metal frame and the bottom cover further includes a repulsive mechanism including a protrusion abutting against another of the metal frame and the bottom cover and a slit formed behind the protrusion to form an elastic portion with a shortened distance to an edge of a member in which the protrusion is formed.

12. A method to assemble an optical transceiver including an optical receiver installed within a housing of the optical transceiver, the housing including a metal frame and a metal bottom cover having thermal conductivity greater than a thermal conductivity of the metal frame, the method comprising steps of:
    assembling the metal bottom cover with the metal frame by sliding a hook formed in a side of the metal bottom cover within a groove formed in a bottom of the metal frame;
    setting a support between the metal bottom cover and the metal frame;
    setting the optical receiver on the support; and
    latching a metal cover with the support to cover the optical receiver.

13. The method of claim 12,
    wherein the support includes a male part and a female part, each of the male part and the female part including a flange, a rear arm and a front arm,
    wherein said step of setting the support includes steps of:
    inserting the flange of one of the male part and the female part into a gap formed between a bottom of the metal frame and the metal bottom cover, and
    inserting the flange of another of the male part and the female part into another gap formed between the metal frame and the metal bottom cover as fitting respective rear arms and respective front arms.

14. The method of claim 12,
    wherein the metal cover provides a front skirt and a rear skirt each providing an opening, and the support provides a front projection and a rear projection, and
    wherein said step of latching the metal cover with the support includes steps of:
    engaging one of the front projection and the rear projection of the support with the opening in one of the front skirt and the rear skirt of the metal cover,
    pivoting the metal cover around one of the front projection and the rear projection engaged with the opening, and
    engaging another of the front projection and the rear projection of the support with the opening in another of the front skirt and the rear skirt of the metal cover.

* * * * *